United States Patent [19]

Kamada et al.

[11] Patent Number: 5,547,437
[45] Date of Patent: Aug. 20, 1996

[54] ADAPTIVE PRESSURE CONTROL BASED ON DIFFERENCE BETWEEN TARGET AND ACTUAL SHIFT TIMES DURING A SHIFT

[75] Inventors: Shinya Kamada, Hiroshima; Hiroaki Yokota, Higashi-hiroshima; Shigeru Nagayama; Yuji Nakahara, both of Hiroshima; Shin Nakano, Higashi-hiroshima; Toshihisa Marusue, Hiroshima; Mitsutoshi Abe, Hiroshima-ken; Hiroyuki Matsumoto, Ibaraki-ken, all of Japan

[73] Assignee: Mazda Motor Corporation, Hiroshima-ken, Japan

[21] Appl. No.: 321,874

[22] Filed: Oct. 14, 1994

[30] Foreign Application Priority Data

Oct. 20, 1993 [JP] Japan .................................... 5-262115

[51] Int. Cl.$^6$ ........................................... F16H 61/04
[52] U.S. Cl. ........................................ 477/143; 477/155
[58] Field of Search ................................ 477/143, 144, 477/148, 154, 155, 156; 475/128

[56] References Cited

U.S. PATENT DOCUMENTS

| | | | |
|---|---|---|---|
| 4,283,970 | 8/1981 | Vukovich | 477/143 |
| 4,783,216 | 12/1988 | Hirmamatsu et al. | 477/148 |
| 4,845,618 | 7/1989 | Narita | 477/154 X |
| 4,870,581 | 9/1989 | Ito et al. | 477/154 X |
| 4,942,530 | 7/1990 | Boda et al. | 477/155 X |
| 4,949,595 | 8/1990 | Shimanaka | 477/155 |
| 4,953,090 | 8/1990 | Narita | 477/143 X |
| 4,998,451 | 3/1991 | Sano | 477/143 X |
| 5,079,972 | 1/1992 | Iizuka | 477/143 X |
| 5,168,449 | 12/1992 | Benford | 477/148 X |
| 5,251,509 | 10/1993 | Pollack et al. | 477/155 X |
| 5,443,595 | 8/1995 | Shimei et al. | 477/155 |

FOREIGN PATENT DOCUMENTS 63-3183  1/1988  Japan .

Primary Examiner—Khoi Q. Ta
Attorney, Agent, or Firm—Keck, Mahin & Cate

[57] ABSTRACT

A shift control system of an automatic transmission includes a first element which is to be released in a shift operation, a second element which is to be engaged in the shift operation, and a target shift time set section for setting a target time period of the shift operation needed for releasing the first frictional element and engaging the second frictional element. A shift time calculation section is provided for obtaining an actual time period of the shift operation needed for releasing the first frictional element and engaging the second frictional element, and a releasing pressure control section is provided for receiving output of the target shift time set section and the shift time calculation section for controlling a releasing pressure of the first frictional element in the shift operation based on the difference between the target and actual time periods of the shift operation. An engaging pressure control section is used for controlling an engaging pressure of the second frictional element in the shift operation. A shift shock is effectively suppressed by the shift control system.

14 Claims, 12 Drawing Sheets

FIG. 11
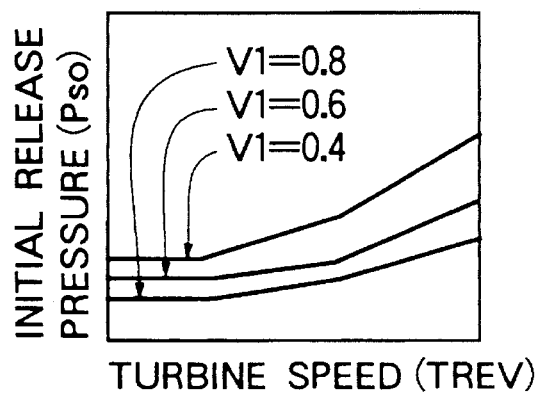
FIG. 12
| V1 | TREV | | | |
|---|---|---|---|---|
|  | 1000 | 1400 | 1800 | 2200 |
| 0.4 | PLN11 | PLN12 | PLN13 | PLN14 |
| 0.6 | PLN21 | PLN22 | PLN23 | PLN24 |
| 0.8 | PLN31 | PLN32 | PLN33 | PLN34 |
| 1.2 | PLN41 | PLN42 | PLN43 | PLN44 |
FIG. 13
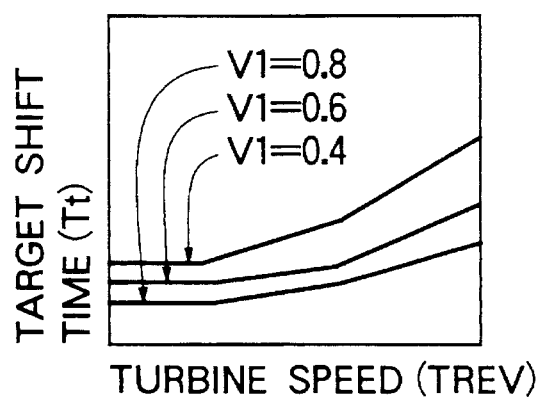

ADAPTIVE PRESSURE CONTROL BASED ON DIFFERENCE BETWEEN TARGET AND ACTUAL SHIFT TIMES DURING A SHIFT

BACKGROUND OF THE INVENTION

1. Field of the Invention

The present invention relates to a control system of an automatic transmission.

2. Description of Related Art

Conventionally, as a learning control of a line pressure control of the hydraulic control system of an automatic transmission during a shift operation, it has been known that a time period of the shift operation is measured to be compared with a target time period for the shift operation. If the actual time period is longer than the target value, the line pressure is increased and, conversely, if the actual time period is shorter than the target value, the line pressure is decreased. (see Japanese Patent Publication No. 63-3183 issued in 1988).

Meanwhile, the learning control of the line pressure is carried out only in an up-shift operation, where the engine rotation speed is reduced, and not carried out in a down-shift operation. This is because there is no control of a draining speed when a shift valve is switched to drain a hydraulic fluid through an orifice in the down-shift operation. With such an automatic transmission, when a 3-4 clutch pressure is abruptly released in a 3-2 shift operation in which a 3-4 clutch as a first frictional element is released and a 2-4 brake as a second frictional element is engaged, a shift shock (sudden dragging) is produced. In order to eliminate such shift shocks, it is necessary to control a releasing pressure of the frictional element properly by extending the time period for shift operation. In other words, the releasing pressure should be controlled in accordance with a turbine torque.

It should be noted that a frictional coefficient of a material forming the frictional element is largely changed with age and varies depending on a product. Therefore, in order to control the shift shock successfully, the above factors should be taken into account.

SUMMARY OF THE INVENTION

It is therefore an object of the present invention to provide a shift control system of an automatic transmission to properly control a release of a first frictional element in a shift operation where a second frictional element is engaged to effectively suppress the shift shock.

The above and other objects of the invention can be accomplished by a shift control system of an automatic transmission including a first element which is to be released in a shift operation, a second element which is to be engaged in the shift operation, target shift time set section for setting a target time period of the shift operation needed for releasing the first frictional element and engaging the second frictional element, shift time calculation section for obtaining an actual time period of the shift operation needed for releasing the first frictional element and engaging the second frictional element, releasing pressure control section receiving output of the target shift time set section and the shift time calculation section for controlling a releasing pressure of the first frictional element in the shift operation based on the difference between the target and actual time periods of the shift operation, and engaging pressure control section for controlling an engaging pressure of the second frictional element in the shift operation.

Preferably, the target time set means sets the target time period for the shift operation based on a turbine torque.

In this case, the turbine torque can be obtained through a map which provides a relationship between a turbine speed of the automatic transmission and a speed ratio of the turbine speed to an engine speed of a vehicle.

In a preferred embodiment, the releasing pressure is determined based on a control value which is obtained based on a relationship between a turbine speed of the automatic transmission and a speed ratio of the turbine speed to engine speed of a vehicle.

The control value may be determined based on a map which provides a relationship between the turbine speed and the speed ratio. The control value is renewed depending on the difference between the target and actual time periods. In this case, the control value is increased as the difference between the target and actual time periods is increased.

In another embodiment, the engaging means controls the engaging pressure of the second frictional element based on a change of an input speed of the automatic transmission.

The shift control system according to the present invention preferably comprises further abrupt acceleration detecting means for detecting abrupt acceleration condition, timing control means for receiving an output of the abrupt acceleration detecting means, in the abrupt acceleration condition, prohibiting the control by the releasing control means and carrying out a timing control in which a shift valve is immediately switched to complete the shift operation.

According to the present invention, in a shift operation in which the first frictional element is released and the second frictional element is engaged, the releasing pressure is controlled based on a difference between the target time period of the shift operation and the actual time period thereof. Thus, the release of the first frictional element is properly controlled to suppress the shift shock.

According to another aspect of the present invention, the target time period of the shift operation is set based on the turbine torque. Further, the engaging pressure of the second frictional element is controlled based on the input speed of the transmission such as turbine speed. Thus, the engaging timing of the second frictional element is properly controlled to eliminate a shift timing error.

In another aspect of the invention, a hydraulic control is carried out only under a gradual acceleration and under an abrupt acceleration, the control by the releasing pressure control means is stopped to improve the responsiveness of the shift control. For this purpose, the timing control is executed to switch the shift valve.

Further objects, features and advantages of the present invention will become apparent from the Detailed Description of Preferred Embodiments which follows when read in light of the accompanying Figures.

BRIEF DESCRIPTION OF THE DRAWINGS

FIG. 11 is a graphical representation of a map 1 providing a relationship between an initial value and the turbine speed;

FIG. 12 is a tabular diagram of a map 2 providing a relationship of the turbine speed, speed ratio and learning control value;

FIG. 13 is a graphical representation of a map 3 providing a relationship of the turbine torque, speed ratio and turbine speed;

DETAILED DESCRIPTION OF THE PREFERRED EMBODIMENT

Figure 1:
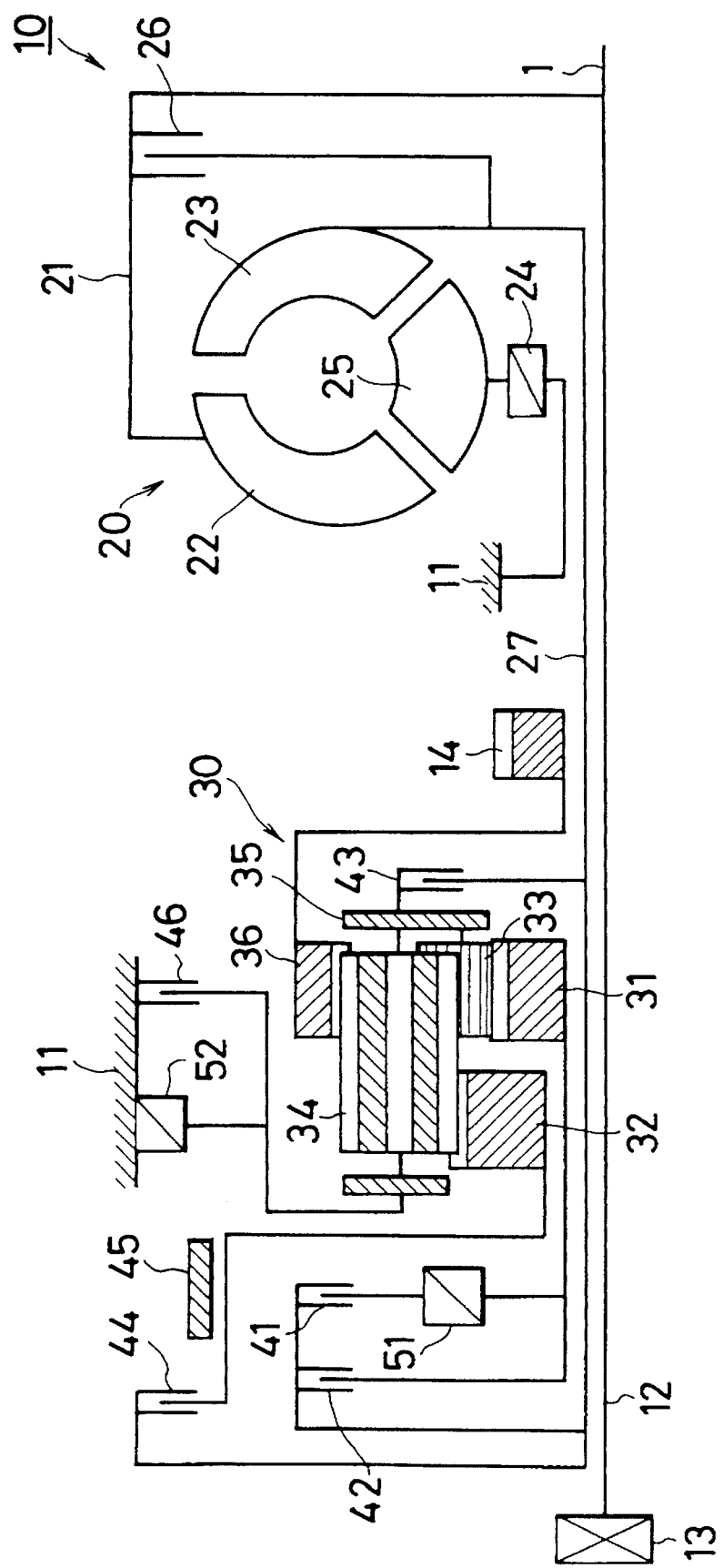
FIG. 1 is a schematic view of an automatic transmission to which a shift control system in accordance with a preferred embodiment of the present invention can be applied.

Referring to FIG. 1, an automatic transmission 10 according to the present invention includes a torque converter 20, a transmission gear mechanism 30 driven by an output of the torque converter 20, a plurality of frictional elements 41–46, such as clutches and brakes, for switching a power transmitting path of the transmission gear mechanism 30 and one way clutches 51 and 52 among running ranges D, S, L and R and shift stages 1–4 in the D range, 1–3 in the S range and 1 and 2 in the L range.

The torque converter 20 is provided with a pump 22 integral with a transmission case 21 connected with an output shaft 1 of an engine, a turbine 23 disposed facing the pump 22 and driven thereby through a hydraulic fluid, a stator 25 disposed between the pump 22 and turbine 23 and carried by the transmission case 11 through a one way clutch 24 and a lock-up clutch 26 for directly connecting a turbine shaft 27 with the engine output shaft 1 through the converter case 21. A rotation of the turbine 23 is transmitted to the transmission gear mechanism 30 through the turbine shaft 27. To the engine output shaft 1 is connected a pump shaft 12, which passes through the turbine shaft 27 and drives an oil pump 13 which is disposed at a rear end portion of the transmission gear mechanism 30.

The transmission gear mechanism 30 is constituted by Ravigneaux-type planetary gear mechanism and provided with a a small sun gear 31 arranged over the turbine shaft 27, a large sun gear 32 arranged over the turbine shaft 27 rearward of the small sun gear 31, a plurality of short pinion gears 33 meshed with the small sun gear 31, a long pinion gear 34 of which a rear portion is meshed with the large sun gear 32, a carrier 35 rotatably supporting the long pinion gear 34 and the short pinion gear 33 and a ring gear 36 meshed with the long pinion gear 34.

Between the turbine shaft 27 and small sun gear 31 are disposed a forward clutch 41 and a first one way clutch 51 in tandem. A coast clutch 42 is juxtaposed with the clutches 41 and 51. A 3-4 clutch 43 is disposed between the turbine shaft 27 and the carrier 35. A reverse clutch 44 is disposed between the turbine shaft 27 and the large sun gear 32. Between the large sun gear 32 and the reverse clutch 44 is disposed a 2-4 brake 45 of a band brake type for fixing the large sun gear 32. Also provided area second one way clutch 52 for receiving a reaction force of the carrier 35 and a low-reverse brake 46 for fixing the carrier 35. The ring gear 36 is connected with the output gear 14 through which the rotation is transmitted to right and left wheels (not shown).

Explaining a relationship between the operations of the clutches 51 and 52 and the shift stages, in the first stage, the forward clutch 41 is engaged and the first and second one way clutches 51 and 52 are locked. As a result, the output rotation of the torque converter 20 is transmitted to the small sun gear 31 of the transmission gear mechanism through the turbine shaft 27, forward clutch 41 and one way clutch 51. In this case, the carrier 35 is fixed by means of the second one way clutch 52 so that the transmission gear mechanism 30 operates as a fixed gear train which transmits the rotation from the small sun gear 31 to the ring gear through the short pinion gear 33 and long pinion gear 34 without making a differential action. As a result, the first stage of a large reduction ratio corresponding to a diameter ratio between the small sun gear 31 and the ring gear 36 is obtained.

In a second stage, the 2-4 brake 45 is further engaged in addition to the condition of the first stage. The large sun gear 32 is fixed and the second one way clutch 52 is brought to a racing condition. As a result, the rotation of the turbine shaft 27 is transmitted to the small sun gear 31 and then to the long pinion gear 34 through the short pinion gear 33. In this case, since the large sun gear 32 is fixed, the long pinion gear 34 moves around the large sun gear 32 and thus the carrier 35 is rotated. As a result, the rotation speed of the ring gear 36 is increased by the rotation of the carrier 35 (revolution speed of the long pinion gear 34) compared with the first stage. Thus, the second stage of a smaller reduction ratio than the first stage is obtained. In this case, the 2-4 brake 45 is operated to apply the braking force against normal rotation or rotation for a forward movement.

In a third stage, the 2-4 brake is released in the second stage and the 3-4 clutch 43 is engaged. As a result, the rotation of the turbine shaft 27 is transmitted to the small sun gear 31 through the forward clutch 41 and first one way clutch 51 as well as to the carrier 35 through the 3-4 clutch 43. Thus, the transmission mechanism 30 is integrally rotated so that the third stage is obtained in which the ring gear 36 is rotated at the same speed as the turbine shaft 27.

In a fourth stage, the 2-4 brake which is once released in the third stage is engaged again. Therefore, the rotation of the turbine shaft 27 is transmitted to the carrier 35 of the transmission gear mechanism 30 through the 3-4 clutch 43 so that the long pinion gear 34 moves around the sun gear 32. In this case, since the large sun gear 32 meshed with the long pinion gear 34 is fixed by means of the 2-4 brake 45, the long pinion gear 34 moves around the sun gear 32 together with the carrier 35 and revolves on its own axis. As a result, the rotation of the ring gear 36 meshed with the long pinion gear 34 is increased by the rotation of the carrier 35 (the rotation of the turbine shaft 27) and the rotation of the long pinion gear 34 on its own axis so that the fourth stage of an over drive can be obtained. In this case, the forward clutch is engaged. It should be noted that the one way clutch 51 in tandem with the forward clutch 41 is raced so that there is no fear that the rotation of the turbine shaft 27 is introduced to the small sun gear 31.

In a rearward stage, the reverse clutch 44 and the low-reverse brake 46 are engaged. Thus, the rotation of the turbine shaft 27 is introduced to the large sun gear 32 and the carrier 35 of the transmission gear mechanism 30 is fixed. Therefore, the rotation of the turbine shaft 27 is transmitted to the ring gear 36 through a fixed gear train including the large sun gear 32 and long pinion gear 34. A reduction ratio corresponding to the diameter of large sun gear 34 and ring gear 36 can be obtained. In this case, the rotating direction of the ring gear 36 is opposite to that of the turbine shaft 27 or the large sun gear 32.

The first one way clutch 51 transmitting the rotation in the first to third stage and the second one way clutch 52 bearing a reaction force in the first stage are raced in a coasting condition. Therefore, in the above shift stages, the engine brake is not enacted. However, in the third stage in D range, second and third stages of S range and first and second stages of L range, the coast clutch 42 in parallel with the first one way clutch 51 is engaged and in the first stage of L range, low-reverse brake 46 in parallel with the second one way clutch 52 is engaged to provide the engine brake.

Table 1 shows operations of the respective frictional elements 41–46 such as clutches and brakes and one way clutches 51 and 52.

Figure 2:
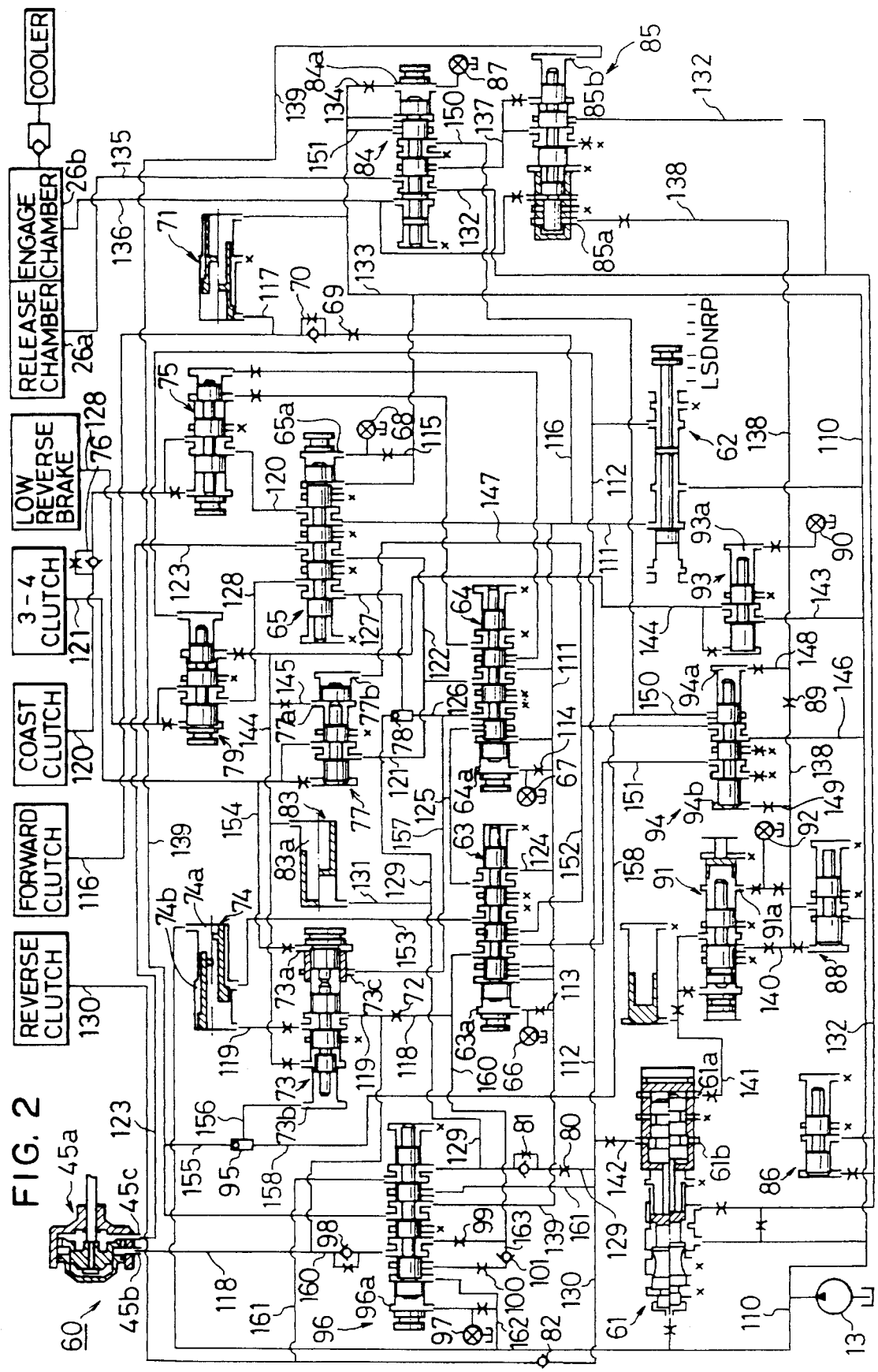
FIG. 2 shows a hydraulic control circuit incorporated into the automatic transmission of FIG. 1.
Figure 3:
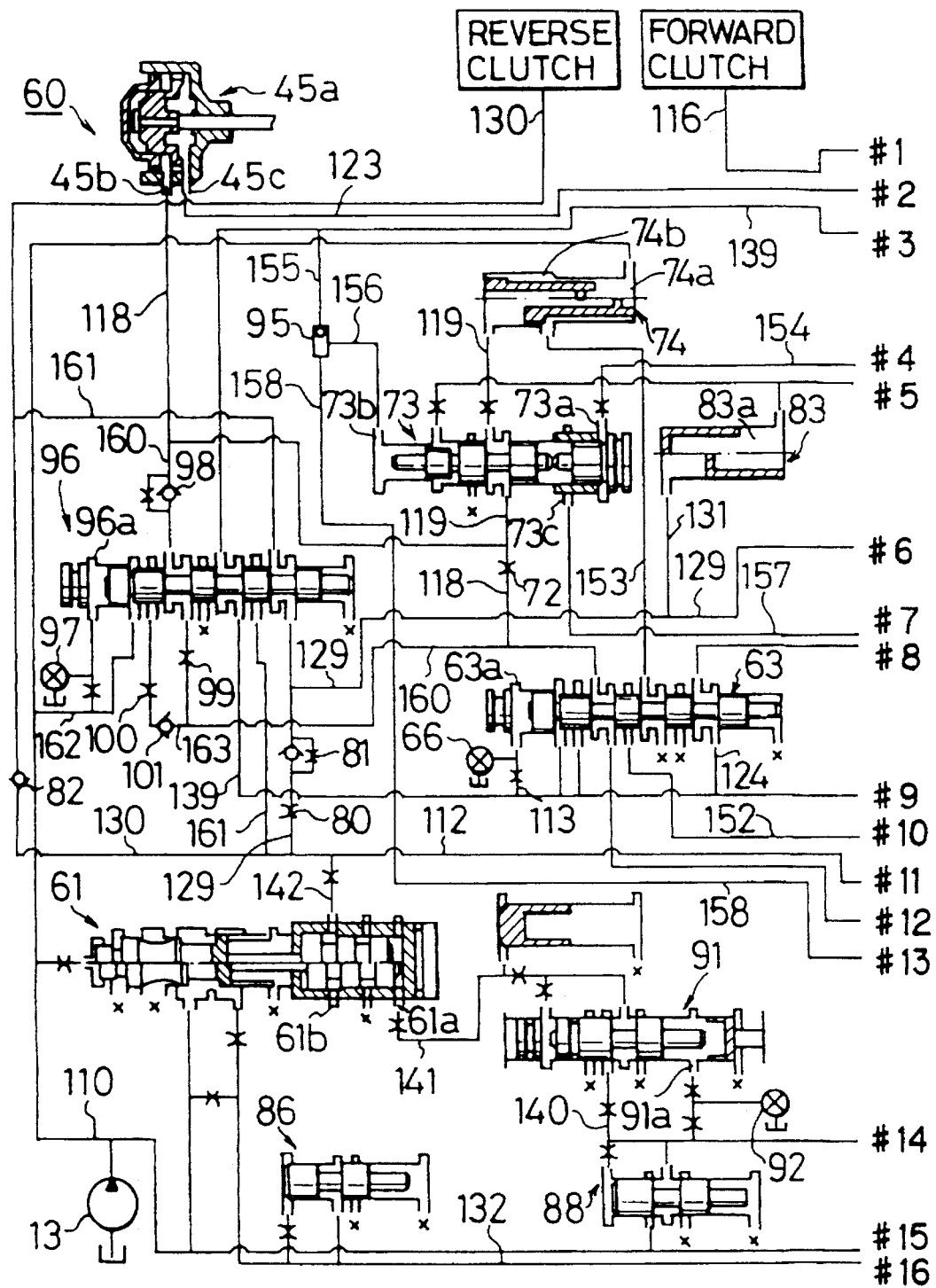
FIG. 3 is an enlarged view of a left half portion of the hydraulic control circuit of FIG. 2.
Figure 4:
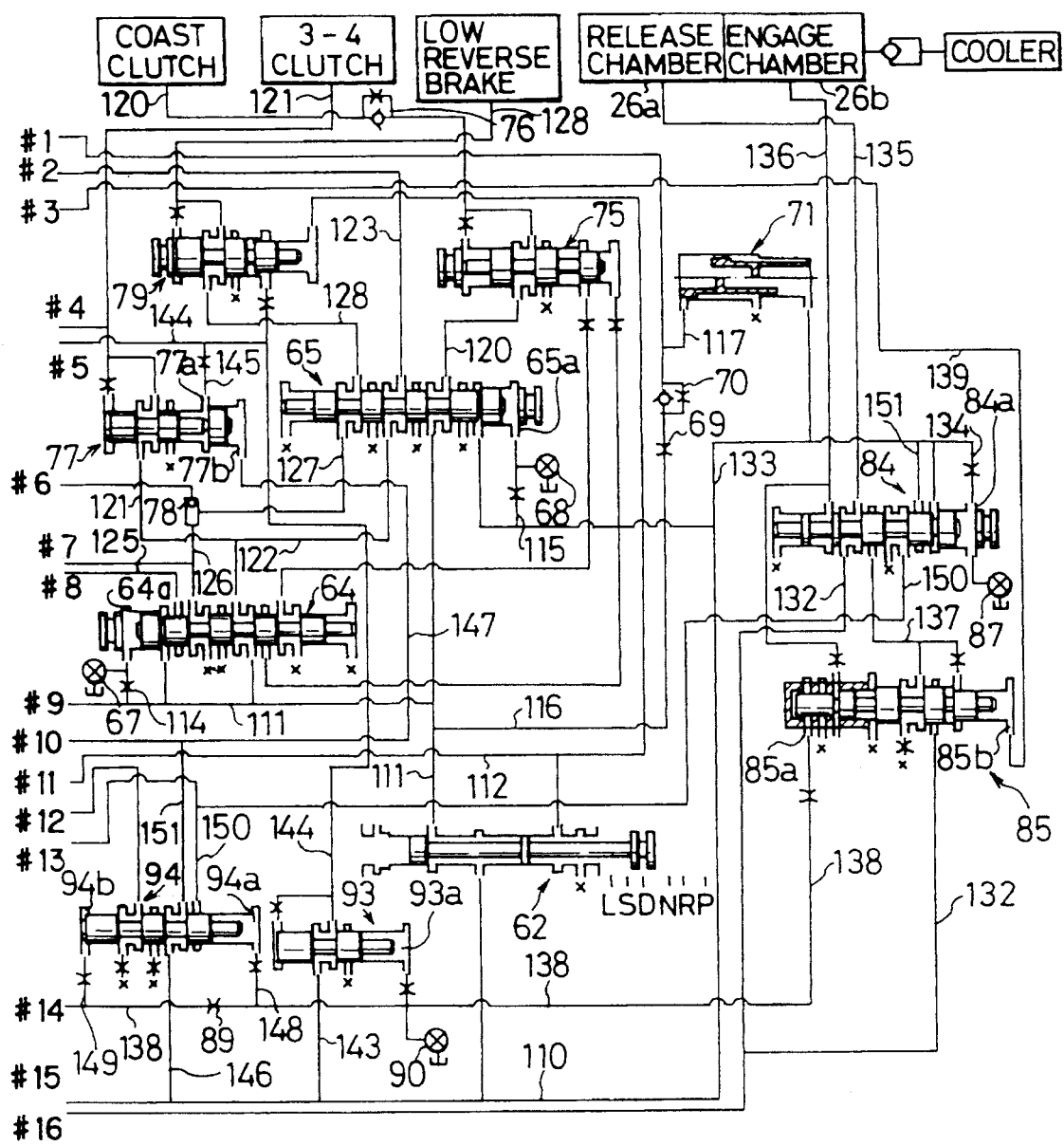
FIG. 4 is an enlarged view of a right half portion of the hydraulic control circuit of FIG. 2.

Next, a hydraulic pressure control circuit controlling actuators of the frictional elements 41–46 is explained hereinafter. The automatic transmission 10 is provided with a hydraulic control circuit 60 as shown in FIG. 2.

An actuator 45a of the 2-4 brake 45 of band brake includes a servo piston provided with an apply port 45b and release port 45c. When the hydraulic pressure is applied to only the apply port 45b, the actuator 45a engages the 2-4 brake 45. On the other hand, when no hydraulic pressure is applied to the ports 45b nor 45c or hydraulic pressure is applied both the ports 45b and 45c, the 2-4 brake is released. Actuators of the other frictional elements 41–44 and 46 are constituted by conventional hydraulic pistons respectively to engage the frictional elements 41–44 and 46.

The hydraulic control circuit 60 includes a regulator valve 61 for adjusting a hydraulic pressure delivered to a main line 110 from the oil pump 13 of FIG. 1 to a predetermined line pressure, a manual valve 62 for selecting a range by a manual operation, and first, second and third shift valves 63, 64 and 65 for controlling the hydraulic pressure of the actuators of the frictional elements 41–46.

The manual valve 62 is able to select one of D, S, L ranges for forward movement, R range for rearward movement, N range for neutral position and P range for parking. In the ranges of the forward movement, the manual valve 62 connects the main line 110 with a forward line 111 and with a rearward line 112 in the R range.

The first, second and third shift valves 63, 64 and 65 are formed with control ports 63a, 64a and 65a. To the ports 63a and 64a are connected first and second base pressure lines 113 and 114 separated from the forward line 111 respectively. To the control port 65a of the third shift valve 65 is connected a third base pressure line 115 separated from the main line 110. On the base pressure lines 113, 114 and 115 are disposed a first, second and third solenoid valves 66, 67 and 68 respectively. When the first and second solenoid valves 66 and 67 are ON, the valves 66 and 67 discharge the control pressures from the control ports 63a and 64a to move spools of the first and second shift valves 63 and 64 at left positions respectively. When OFF, the solenoid valves 66 and 67 move the spools of the valves 63 and 64 against a resilient force of a spring to the right positions. The third solenoid valve 68 discharges the control pressure of the control port 65a to move the spool of the valve 65 to a right position when it is ON. When OFF, the valve 68 introduces the control pressure to the port 65a from the third base pressure line 115 to move the spool against a resilient force of a spring to a left position.

The solenoid valves 66 -68 are ON, OFF controlled based on signals from a controller on a predetermined map set in accordance with a vehicle speed and throttle opening of engine. Consequently, the positions of the spools of the shift valves 63 -65 are switched and thus switch hydraulic paths of the frictional elements 41–46 so that the elements 41–46 are engaged as shown in Table 1. Relationships between ON, OFF operations of the solenoid valves 66–68 and respective shift stages of the D, S and L ranges are shown in Table 2.

TABLE 1

| RANGE | | FORWARD CLUTCH (41) | COAST CLUTCH (42) | 3-4 CLUTCH (43) | REVERSE CLUTCH (44) | 2-4 BRAKE (45) | LOW REVERSE BRAKE (46) | ONEWAY CLUTCH FIRST (51) | ONEWAY CLUTCH SECOND (52) |
|---|---|---|---|---|---|---|---|---|---|
| P | | | | | | | | | |
| R | | | | | ○ | | ○ | | |
| N | | | | | | | | | |
| D | 1 | ○ | | | | | | ○ | ○ |
|   | 2 | ○ | | | | ○ | | ○ | |
|   | 3 | ○ | ○ | ○ | | | | ○ | |
|   | 4 | ○ | | | ○ | ○ | | | |
| S | 1 | ○ | | | | | | ○ | ○ |
|   | 2 | ○ | ○ | | | ○ | | ○ | |
|   | 3 | ○ | ○ | ○ | | | | ○ | |
| L | 1 | ○ | ○ | | | | ○ | ○ | ○ |
|   | 2 | ○ | ○ | | | ○ | | ○ | |

TABLE 2

| RANGE | D | | | | S | | | L | |
|---|---|---|---|---|---|---|---|---|---|
| SHIFT STAGE | 1 | 2 | 3 | 4 | 1 | 2 | 3 | 1 | 2 |
| FIRST SOLENOID VALVE (66) | OFF | ON | ON | ON | OFF | ON | ON | OFF | ON |
| SECOND SOLENOID VALVE (67) | ON | ON | OFF | OFF | ON | ON | OFF | ON | ON |
| THIRD SOLENOID VALVE (68) | ON | ON | OFF | ON | ON | OFF | OFF | OFF | OFF |

When the D, S or L are set by the manual valve, a line 116 is separated from the forward line 111 connected with the main line 110. The line 116 as a forward clutch line is connected to a forward clutch 41 through an orifice 69 and one way orifice 70. Thus, the forward clutch 41 is usually engaged in the D, S and L ranges. On the forward clutch line 116 is disposed N-D accumulator 71 downstream of the one way orifice 70 through line 117.

The forward line 111 is connected with the first shift valve 63 and is communicated with a servo apply line 118 and with the apply port 45b of the servo piston 45a when the first solenoid valve 66 is turned on so that the spool of the shift valve 63 is shifted to the left position. Thus, when the first solenoid valve 66 is ON in the D, S, L ranges, in other words, when the second, third and fourth shift stages in the D range, second and third shift stage in the S range and the second shift stage in the L range are established and where the hydraulic pressure (servo apply pressure) is introduced into the apply port 45b and a hydraulic pressure (servo release pressure) is not introduced into the release port 45c, the 2-4 brake is engaged. A 1-2 accumulator 74 is connected with the apply port 45b through a line 119 and an accumulation cut valve 73.

The forward line is also connected to the third shift valve 65 and is communicated with a coast clutch line 120 when the spool of the shift valve 65 is in the left position. The coast clutch line 120 is connected to the coast clutch 42 through a coast control valve 75 and one way orifice 76. Thus, when the third solenoid valve 68 is OFF in the D, S and L ranges, in other words, when the third shift stage in the D and S ranges, and the second shift stage in the S and L ranges, and the first shift stage in the L range are established, the coast clutch 42 is engaged.

Further, the forward line 111 is connected to the second shift valve 64 and is communicated with a 3-4 clutch line 121 when the second solenoid valve 67 is OFF and thus the spool of the second shift valve 64 is located at the right position. The line 121 is further connected to a 3-4 clutch 43 through a 3-4 control valve 77. Thus, when the second solenoid valve 67 is OFF in the D, S and L ranges, or when the third and fourth stages of D range and third shift stage of the S range are established, the 3-4 clutch is engaged.

A line 122 separated from the line 121 is connected to the shift valve 65 and is communicated with a servo release line 123 which is connected with the release port 45c of the servo piston 45a when the third solenoid valve 68 is OFF so that the spool of the shift valve 65 is in the left position. As a result, the servo release pressure is introduced to the release port 45c of the servo piston 45a so that the 2-4 brake 45 is released when the second and third solenoid valves 67 and 68 are OFF, in other words, when the third shift stages in the D and S ranges are established.

A line 124 separated from the forward line 111 is connected with the first shift valve 63. The line 124 is connected to a line 125 which is connected to the second shift valve 64 when the spool of the first shift valve 63 is in the right position. On the other hand, to the second shift valve 64 is connected a line 126 which is connected to the line 125 when the second solenoid valve 67 is ON to shift the spool of the second solenoid valve 67 at the left position. The line 126 is connected to the third shift valve 68 through a ball valve 78 and a line 127. The line 126 is connected to a low reverse brake line 128 which is connected to a low reverse brake 46 through a low reducing valve 79 when the third solenoid valve 68 is OFF to shift the spool of the third shift valve 65 at the left position. Thus, the low reverse brake 46 is engaged when the first, second and third solenoid valves 66–68 are OFF, ON and OFF respectively, or when the first shift stage of the L range is established.

A line 129 separated from the reverse line 112 which is connected to the main line 110 in the R range is connected to the third shift valve 65 through an orifice 80, one way orifice 81, the ball valve 78 and the line 127, and is communicated with the reverse brake line 128 when the third solenoid valve 68 is OFF to shift the spool of the valve 65 at the left position. The line 112 as a reverse clutch line 130 is also connected with the reverse clutch 44 through a one way valve 82 which interrupts a discharging flow of the hydraulic fluid. Thus, in the R range, the low reverse brake 46 is engaged when the third solenoid valve 68 is OFF. On the other hand, the reverse clutch is normally engaged in the R range. Meanwhile, N-R accumulator 83 is connected to a line 131 which is separated from the line 129 between the one way orifice and the ball valve 78.

The hydraulic control valve 60 is provided with a fourth shift valve 84 and lock-up control valve 85 for controlling the lock-up clutch 26 of the torque converter 20.

To the fourth shift valve 84 and lock-up control valve 85 is connected a converter line 132 which is connected to the regulator valve 61 through the converter relief valve 86. To a control port 84a at one end of the fourth shift valve 84 is connected a base control pressure line 134 which is connected to the main line 110 through a line 133. The converter line 132 is brought into communication with a releasing line 135 which is connected with a releasing chamber 26a of the torque converter 20 to release the lock-up clutch 26 when a fourth solenoid valve 87 connected to the port 84a for making a lock-up control is OFF to shift the spool of the shift valve 84 at the left position. As a result, the lock-up clutch is released to establish the converter condition.

When the fourth solenoid valve 87 is turned ON to discharge the control pressure from the port 84a to thereby shift the spool of the valve 84 at the right position, the converter line 132 is brought into communication with an engaging line 136 which is connected to an engaging chamber 26b of the torque converter 20 so that the lock-up clutch is engaged. Concurrently, the line 135 is brought into communication with the lock-up control valve 85 through the shift valve 84 and an intermediate line 137 so that a hydraulic pressure adjusted in the control valve 85 is introduced to the releasing chamber 26a as a releasing pressure of lock-up condition.

To control port 85a at one end of the valve 85 is connected a base control pressure line 138 which is connected to the main line 110 through the solenoid reducing valve 88. To interrupt port 85b at the other end of the valve 85 is connected an interrupt line 139 which is connected to the forward line 111. Downstream of an orifice 89 disposed on the base control pressure line 138 is arranged a first duty solenoid valve 90 which adjusts a control pressure to the control port 85a so that a pressure difference between the engaging pressure to the engaging chamber 26a through the converter line 132 and engaging line 136 and the releasing pressure to the releasing chamber 26b through the intermediate line and the releasing line 135 is adjusted to accomplish a desired slip condition of the lock-up clutch 26 provided that the line pressure is not introduced to the interrupt port 85b through the interrupt line 139.

When the line pressure is supplied to the interrupt port 85b of the valve 85 through the line 139, the spool of the control valve 85 is fixed at the left position. In this case, the hydraulic pressure of the lock-up releasing chamber 26a is discharged from the drain port of the control valve 85 through the releasing line 135, fourth shift valve 84 and intermediate line 137 so that a lock-up condition in which the lock-up clutch 26 is fully engaged is established. In the drain port, there is provided an orifice of a predetermined diameter which prevents the hydraulic fluid from excessively flowing out therethrough even if the hydraulic fluid introduced to the engaging chamber 26b through the engaging line 136 is introduced to the releasing chamber 26a.

The first duty solenoid valve 90 operates as follows. As a duty ratio D is increased, a duty control pressure of the first duty solenoid valve 90 is decreased. Therefore, when the duty ratio D is 100%, the drain port of the valve 90 is fully opened so that the pressure level of the base pressure control line 132 is zero downstream of the orifice 89. On the other hand, when the duty ratio D is zero, the drain port is interrupted to maximize the pressure level of the valve 90.

The hydraulic control circuit 60 is provided with a throttle modulator valve 91 and a second duty solenoid valve 92 for controlling a line pressure which is adjusted by the regulator valve 61.

To the throttle modulator valve 91 is connected a line 140 which is connected to the main line 110 through the solenoid reducing valve 88. To a control port 91a at one end is introduced a duty control pressure adjusted by a second duty solenoid valve 92 which is periodically opened and closed to produce a throttle modulator pressure in accordance with a duty ratio D of the valve 92. In this case, the duty ratio D is determined in accordance with, for example, a throttle opening so that the throttle modulator pressure corresponding to the duty ratio D is introduced to a first apply port 61 of the regulator valve 61 through a line 141 to increase the line pressure which is adjusted by the regulator valve 61 in accordance with the throttle valve and the like.

In the illustrated embodiment, the duty control pressure produced by the first duty solenoid valve 90 is also introduced into a control port 93a of a modulator valve 93. The modulator valve adjusts the line pressure introduced from the main line 110 through a line 143 in accordance with the duty control pressure from the first duty solenoid valve 90 to produce a modulator pressure and to introduce the modulator pressure to a back pressure chamber 83a of the N-R accumulator 83 and the like through a line 144.

To a control port 77a of the 3-4 control valve 77 disposed on the 3-4 clutch line is connected a line 145 which is separated from the line 144. Therefore, when the first duty solenoid valve 90 is subjected to a duty control, a modulator pressure is produced in accordance with the duty ratio D and introduced to the port 77a so that a hydraulic pressure (3-4 clutch pressure) which is controlled by the control valve 77 is also controlled to a value corresponding to the duty ratio D.

The 3-4 control valve 77 is provided with an interrupt port 77b at one end for preventing the valve 77 from making a pressure adjusting action (pressure reducing action).

To the interrupt port 77b is connected an interrupt line 146 which is connected to the main line 110 through a switching valve 94 and a line 146. When the line 147 is communicated with the line 146 through the switching valve 94, the line pressure is introduced to the interrupt port 77b of the 3-4 control valve from the main line 110 to prevent the control valve 77 from making the pressure adjusting action.

To a control port 94a at one end of the valve 94 is connected a line 148 separated from the base pressure control line 138 between the orifice and the first duty solenoid valve 90. To a balance port 94b at the other end of the valve 94 is connected a line 149 separated from the line 138 upstream of the orifice 89. When the duty control pressure is greater than a predetermined value, the spool of the valve 94 is shifted to the left position so that the interrupt line 147 is brought into the line 146 to introduce the line pressure of the main line 110 to the interrupt port 77b of the valve 77 through the line 146 to prevent the valve 77 from making the pressure adjusting action. When the duty control pressure produced by the first duty solenoid 90 is reduced below the predetermined value, the spool is moved toward the right position against the resilient force of the spring to separate the interrupt line 147 from the line 146.

To the switching valve 94 is connected a line 150 which is brought into communication with the line 147 when the spool is in the right position. The line 150 is connected to the fourth shift valve 84 and is brought into communication with a line 151 which is connected to the main line 110 through the line 133 when the spool of the shift valve 84 is in the right position. In other words, when the fourth solenoid valve 87 is turned ON to enable a control of the engaging force of the lock-up clutch 26, the line pressure from the main line 110 is introduced to the interrupt line 147 through the lines 133, 151, fourth shift valve 84 and line 150. In the converter condition in which the spool of the valve 84 is in the left position, the line 150 is connected to a drain port of the shift valve 84.

To the switching valve 94 is connected a drain line 151 which is brought into communication with the servo apply line 118 when the spool of the first shift valve 63 is in the right position. The drain line 151 is selectively connected to two drain ports with different flow reduction rates. In the illustrated embodiment, the right hand drain port is smaller than the left hand drain port.

To the first shift valve 63 is connected a line 152 separated from the interrupt line 147. When the first solenoid valve 66 is turned ON to shift the spool of the shift valve 63 to the left position, the line 152 is brought into communication with the line 153 which is connected to a second back pressure port 74b of the 1-2 accumulator 74 to which the line pressure from the main line 110 is introduced at a first back pressure chamber 74a. Therefore, when the line pressure is introduced to the line 147 and when the spool of the shift valve 63 is in the left position, the line pressure is introduced to the second back pressure chamber 74b of the 1-2 accumulator 74 through the line 152 and the line 153.

To a control port 73a at one end of the accumulation cut valve 73 disposed on the line 119 which is separated from the servo apply line 118 and is connected to the 1-2 accumulator 74 is connected a line 154 separated from the 3-4 clutch line 121 downstream of the 3-4 control valve 77. To an accumulation cut interrupt port 73b at the other end of the valve 73 is connected a line 157 which is connected to the interrupt line 139 for preventing the lock-up control valve 85 from making the pressure adjusting action through a ball valve 95 and line 156. To an intermediate port 73c provided at an intermediate portion of the accumulation cut valve 73 is connected a line 158 separated from the line 126 which is connected to the second shift valve 64.

To the ball valve 95 connected to the line 157 which is communicated with the accumulation cut port 73b of the valve 73 is connected a line 158 separated from a line 150 connecting the switching valve 94 with the fourth shift valve 84.

In addition, the hydraulic control circuit 60 is provided with a fifth shift valve 96 for controlling a shift timing. To the shift valve 96 are connected a first bypass line 160 bypassing the orifice on the servo apply line 118, a second bypass line 161 bypassing the one way valve 82 on the reverse clutch line 130, and the interrupt line 139 connected to the interrupt port 85b of the valve 85. To a control port 96a at one end of the shift valve 96 is connected a base pressure control line 162 separated from the main line 110. When the fifth solenoid valve 97 is switched ON and OFF to shift the positions of the spool of the shift valve 96, the first, second bypass lines 160 and 161 and the interrupt line 139 are opened and closed.

That is, when the fifth solenoid valve 97 is OFF to place the spool of the shift valve 96 at the right position, the first bypass line 160 and interrupt line 139 are opened whereas the second bypass line 161 is interrupted. In this case, a downstream portion of the second bypass line 161 is connected with the line 129 on which the orifice 80 and one way orifice 81 are disposed. Then, the line 161 is connected to the reverse clutch line 130 or the reverse line 112 through the line 129. On the other hand, when the fifth solenoid 97 is turned ON to move the spool of the shift valve 96 to the left position, the first bypass line 160 and the interrupt line 139 are interrupted whereas the second bypass line 161 is opened.

On the first bypass line 160 is disposed a one way orifice 98 downstream of the fifth valve 96 for reducing a supply flow of the hydraulic fluid to the valve 96 and a normal type of orifice 99 upstream of the fifth shift valve 96. On a line 163 separated from the first bypass line 160 upstream of the orifice 99 is disposed another orifice 100 smaller than the orifice 99 and a one way valve 101 for preventing a supply flow of the hydraulic fluid to the valve 96. The line 163 is connected to the first bypass line 160 downstream of the valve 96 when the spool of the fifth shift valve 96 is positioned at the left position.

Figure 5:
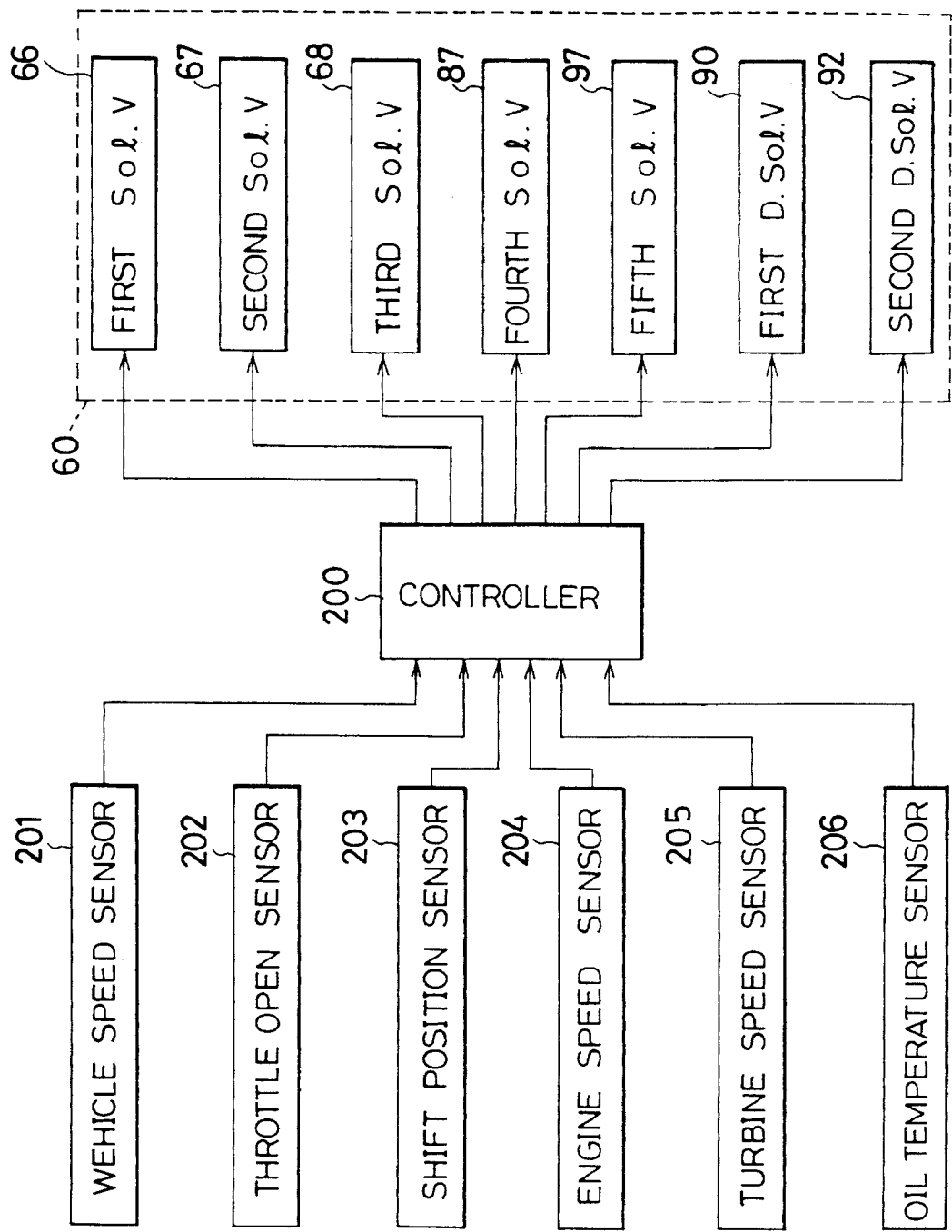
FIG. 5 is a block chart for schematically showing a control for solenoid valves of the hydraulic control circuit.

As shown in FIG. 5, the automatic transmission 10 is provided with a controller 200 for controlling the first to third solenoid valves 66–68 for shift operation, the fourth solenoid valve 87, first duty solenoid valve 90, fifth solenoid valve 97 and second duty solenoid valve 92.

The controller 200, as shown in FIG. 5, receives signals from a vehicle speed sensor 201, throttle opening sensor 202, shift position sensor 203 for detecting a position of shift lever, engine speed sensor 204 for detecting engine speed, turbine speed sensor 205 for detecting a turbine rotation speed, and hydraulic temperature sensor 206 for detecting the temperature of the hydraulic fluid and controls the solenoid valves in accordance with the operating condition or driver's requirement.

Figure 6:
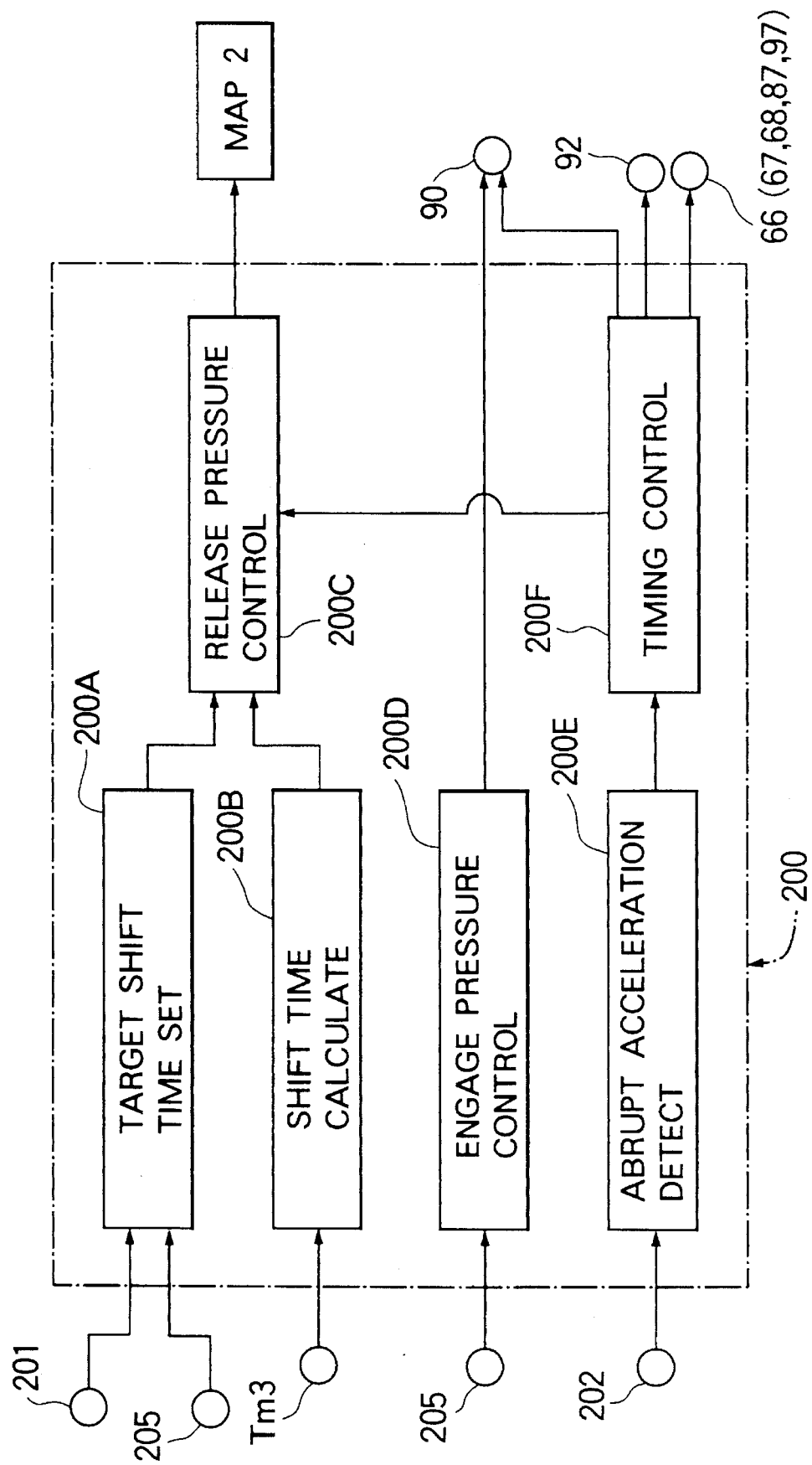
FIG. 6 is a block chart showing an essential portion of a controller of the automatic transmission.

Specifically, the controller 200, as shown in FIG. 6, includes a target shift time set section 200A which sets a target time period needed for releasing the first frictional element (for example, the 3-4 clutch 43 in the case of the 3-2 shift operation) and engaging the second frictional element (for example, the 2-4 brake 45 in the case of the 3-2 shift operation), a shift time calculation section 200B which calculates an actual time period of the shift operation needed for releasing the first frictional element and the second frictional element, releasing pressure control section 200C for controlling a releasing pressure (for example, the 3-4 clutch pressure) of the first frictional element in the shift operation based on an output of the shift time calculation section 200B, engaging pressure control section 200D for controlling an engaging pressure (for example, the servo apply pressure) of the second frictional element in the shift operation based on the input speed of the automatic transmission, abrupt acceleration detecting section 200E for detecting an abrupt acceleration condition based on the output signal of the throttle opening sensor 202 and a timing control section 200F for receiving the output of the abrupt acceleration detecting section and, in the case of the abrupt acceleration condition, prohibiting the control in accordance with the releasing pressure control section 200C and executing a timing control in which a shift switch is timely switched.

Figure 7:
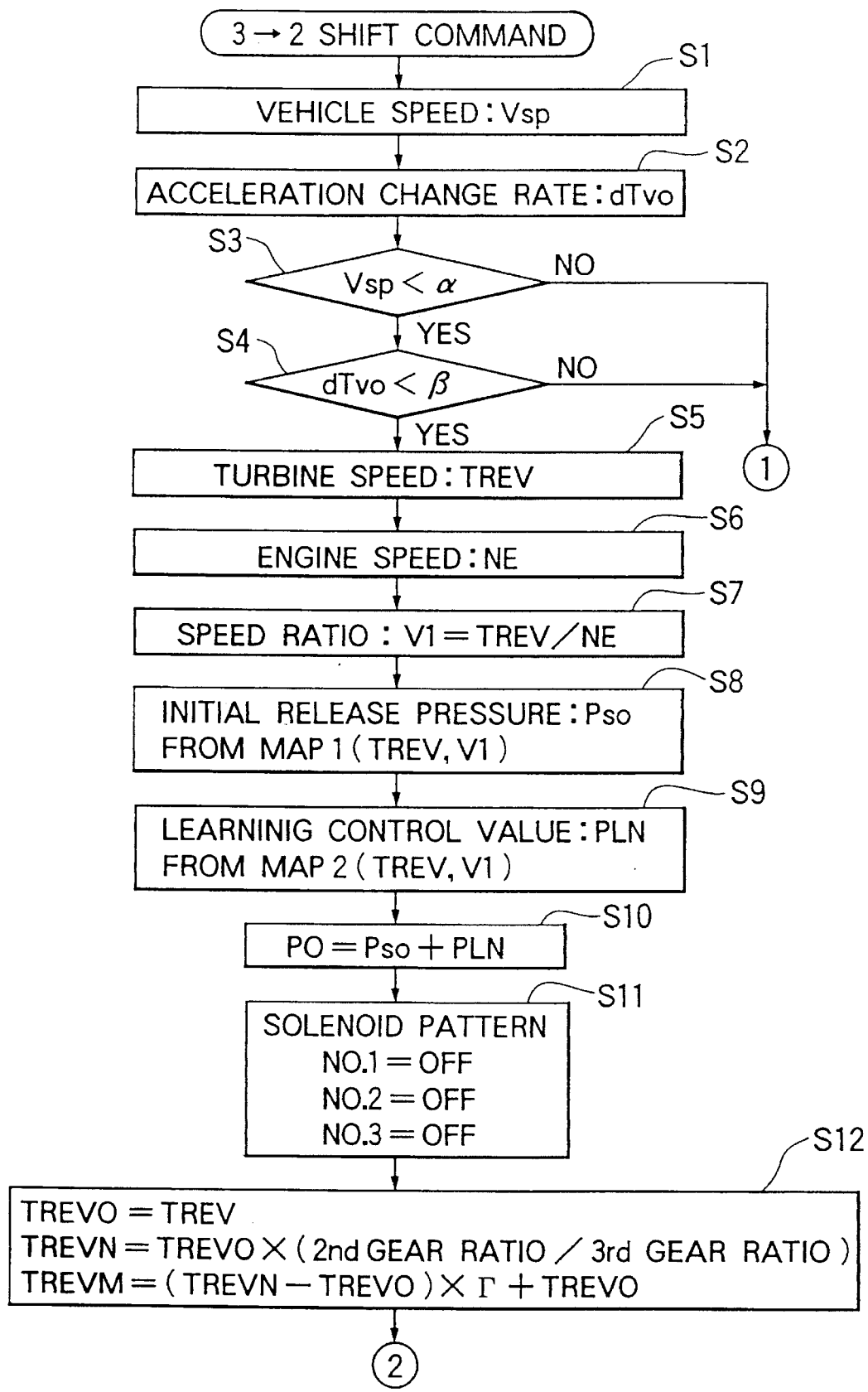
FIG. 7 is a flow chart of a part of a shift operation control by the controller.
Figure 8:
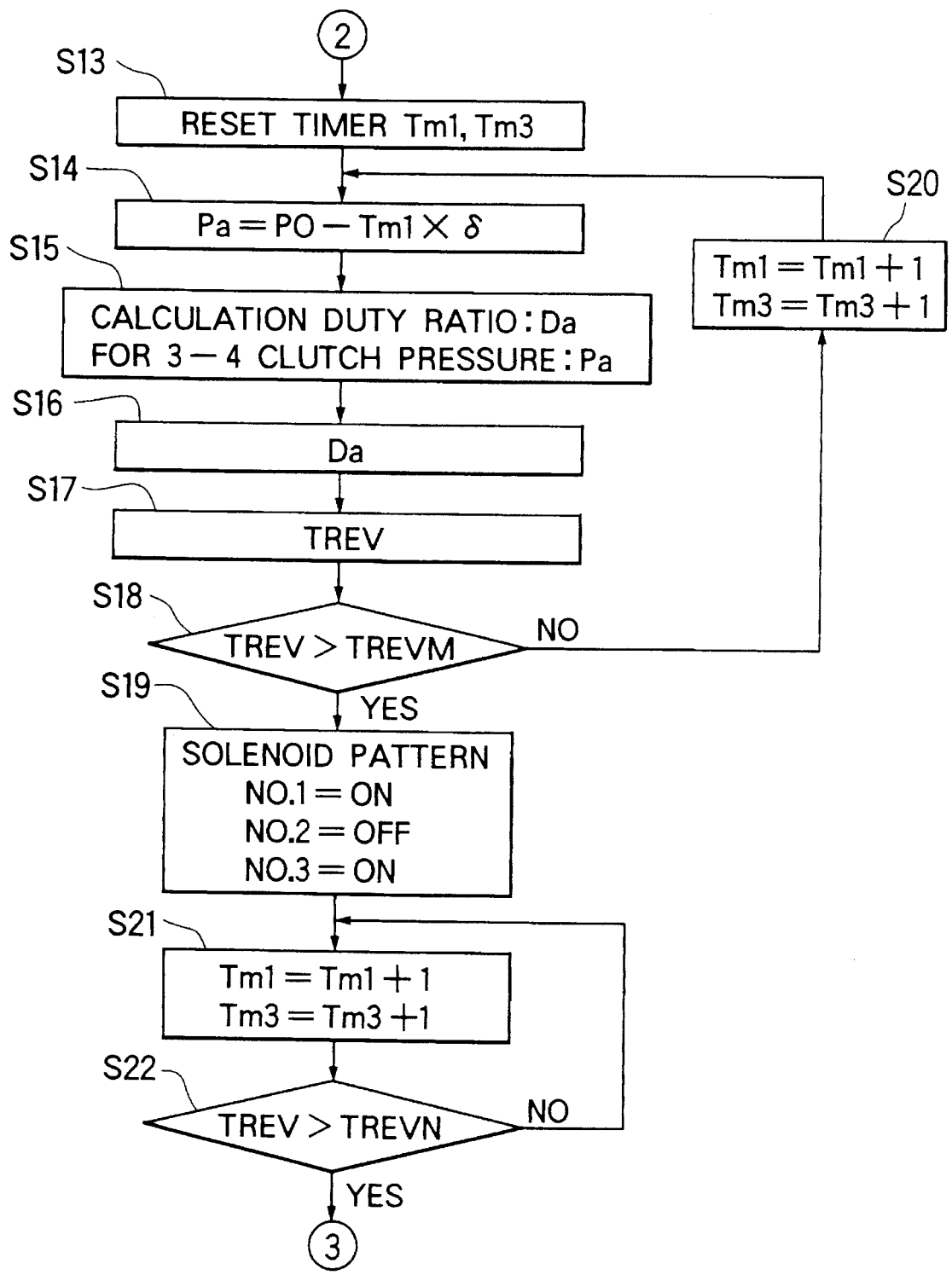
FIG. 8 is a flow chart of a part of a shift operation control by the controller.
Figure 9:
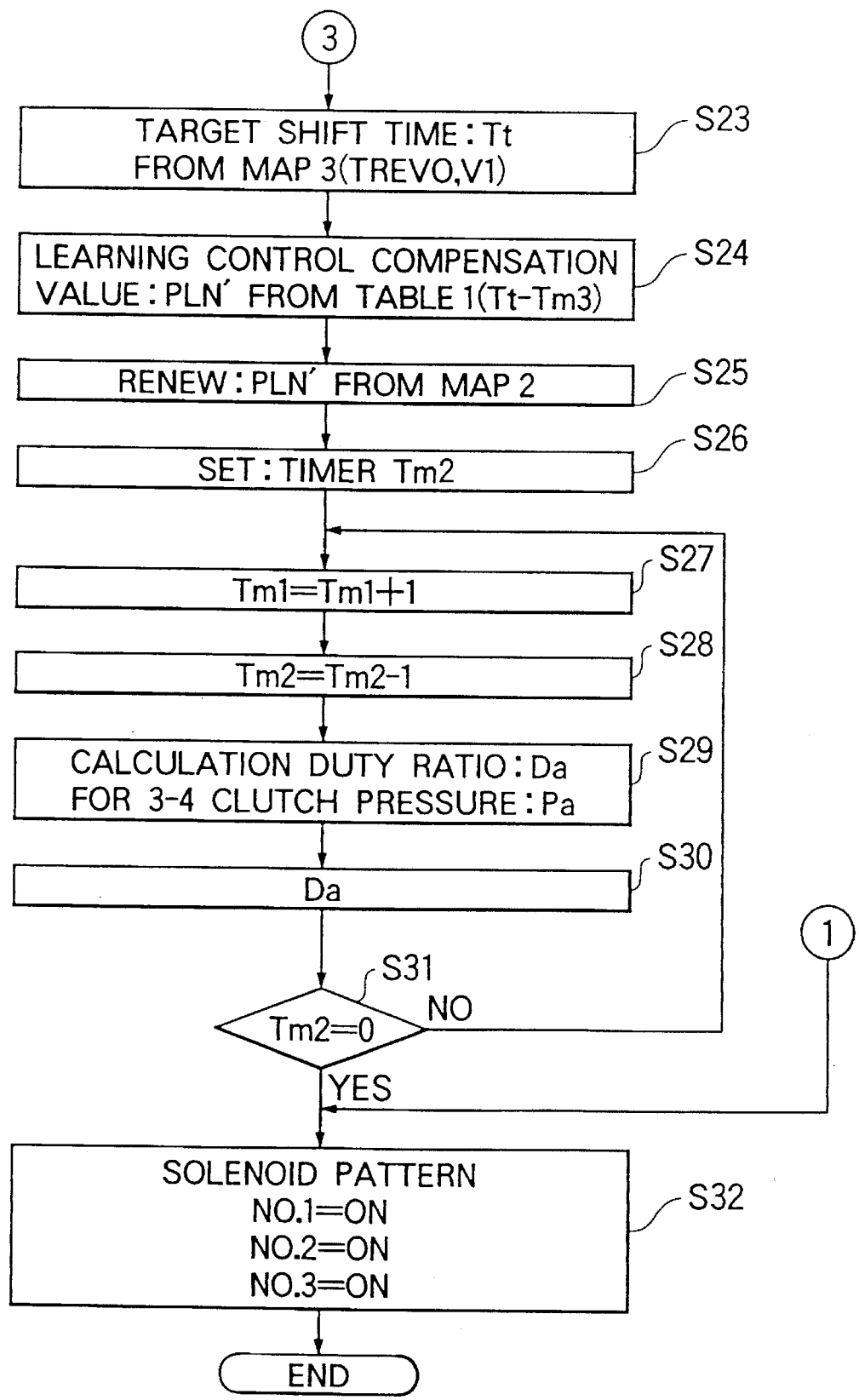
FIG. 9 is a flow chart of a part of a shift operation control by the controller.
Figure 10:
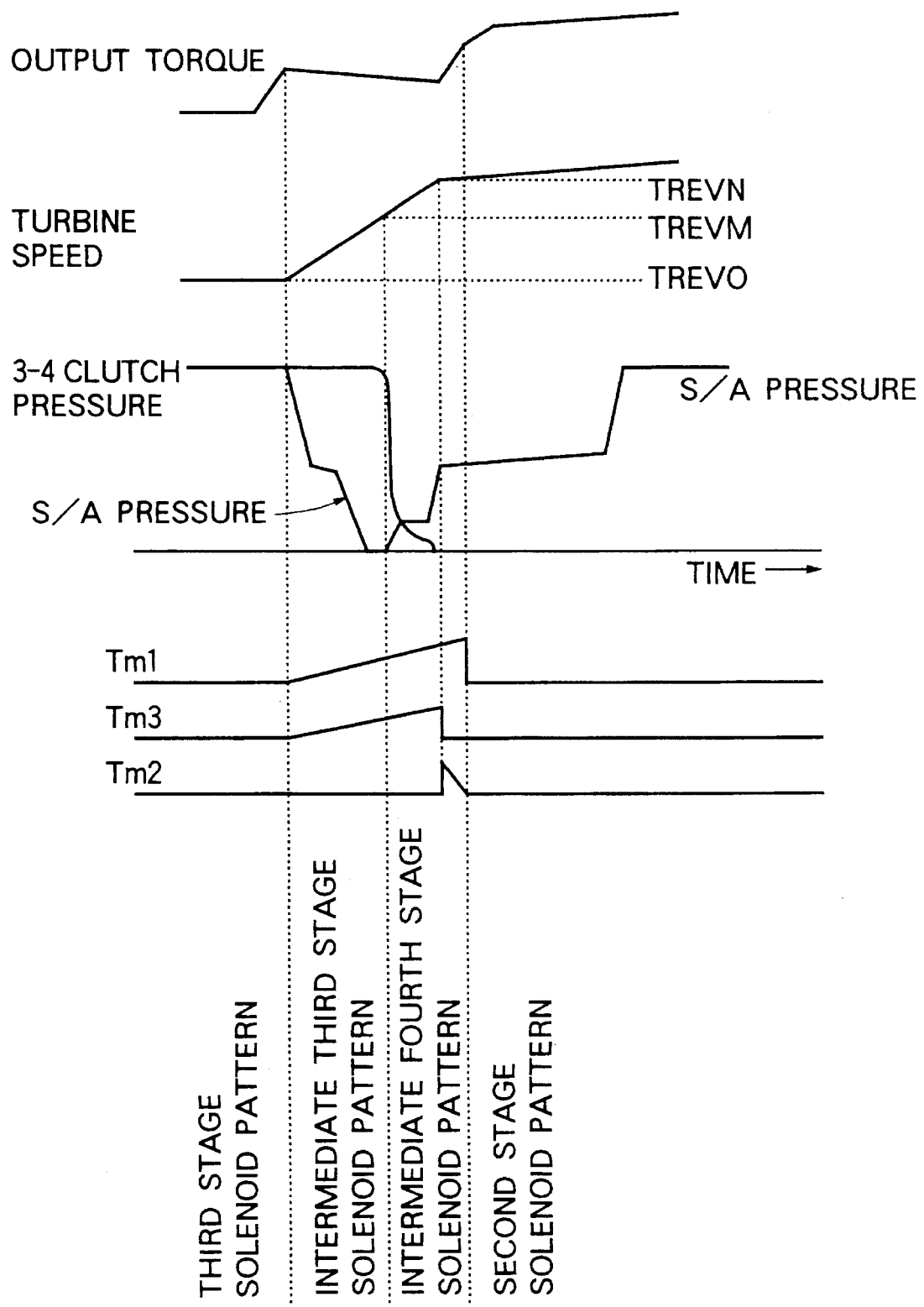
FIG. 10 is a time chart showing a change of the variables involved in the shift operation.

Next, a control flow for the 3-2 shift operation will be explained along FIGS. 7–9. A plateau pressure, or a substantially constant and stable condition of the hydraulic pressure in the change of the releasing pressure is adjusted basically in accordance with the turbine torque. FIG. 10 is a time chart during the 3-2 shift operation.

When a command for the 3-2 shift operation is produced, a vehicle speed $V_{sp}$ is read in (step S1), then, a change rate of the throttle valve opening $dT_{vo}$ is read in (step S2). The controller 200 judges whether or not the vehicle speed $V_{sp}$ is greater than a predetermined value $\alpha$ (step S3). If the vehicle speed $V_{sp}$ is not greater than the value $\alpha$, the controller 200 further judges whether or not the change rate $dT_{vo}$ is not greater than a predetermined value $\beta$ (step S4). If the change rate $dT_{vo}$ is not greater than the predetermined value $\beta$, the controller 200 reads in the engine speed NE (step S6) and calculates a speed ratio V1=TREV/NE (step S7).

On the other hand, where the vehicle speed $V_{sp}$ is greater than the predetermined value $\alpha$ in step S3 and where the change rate $dT_{vo}$ is greater than the predetermined value $\beta$, it is considered that a responsiveness may be desired. Therefore, in this case, the controller 200 executes step S32 or a timing control in which the shift valve is switched to establish the solenoid pattern for the second stage without executing the control based on the difference between the target and actual shift time period.

Then, the controller 200 determines an initial value Pso of the releasing pressure in light of a map 1 (see FIG. 11) based on the turbine speed TREV and speed ratio V1 (step 8) and determines a learning control value PLN (step S9) in light of a map 2 (see FIG. 12) to obtain the releasing pressure P0. Thus, $$P0=Pso+PLN.$$

As seen from the map 1, the speed ratio V1 closes to the value of 1, an increment of the torque is reduced and thus the initial value Pso of the releasing pressure may be small.

Next, the controller 200 controls the first to third solenoid valves 66, 67, 68 to switch from the third stage solenoid pattern in which the first, second and third solenoid valves are ON, OFF and OFF to the intermediate third solenoid pattern in which the first, second and third solenoid valves 66, 67 and 68 are OFF, OFF and OFF respectively (step S11). The intermediate third pattern is a transitional solenoid pattern. The controller determines the variables (step S12) wherein the initial turbine speed TREV0 before the shift operation is replaced by a current turbine speed TREV, the turbine speed TREVN after the shift operation is provided by TREV0*shift ratio (gear ratio of the second stage/gear ratio of the third stage) and wherein the intermediate turbine speed in the transitional condition TREVM is provided by (TREVN−TREV0)*Γ+TREV0. Meanwhile, the value Γ is a damping coefficient of the turbine speed which is not greater than a value 1.

The controller resets a timer Tm1 for counting a total time period of the shift operation and another timer Tm3 for counting an actual time period of the shift operation which is theoretically needed (step S13), determines a control pressure Pa as P0−Tm1*δ (wherein δ is a gradient of the hydraulic pressure) (step S14), calculates a duty ratio Da which provides the 3-4 clutch pressure with a value Pa (step S15), and supplies the first duty solenoid valve 90 with the duty ratio Da (step S16).

Thereafter, the controller 200 reads the current value TREV of the turbine speed (step S17) again and judges whether or not the turbine speed TREV read in is greater than the intermediate turbine speed TREVM (step S18). If the turbine speed TREV is greater than the intermediate turbine speed TREVM, the controller 200 is actuated to establish the intermediate fourth solenoid pattern in which the first, second and third solenoid valve 66, 67 and 68 are ON, OFF and ON respectively (step S19) and switches the shift valve to release the brake which is to be engaged. If the turbine speed TREV is not greater than the intermediate turbine speed TREVM, the controller 200 increases the timers Tm1 and Tm3 by 1 (step S14) and returns to step S14.

After the controller 200 produces signals to establish a predetermined solenoid pattern in step S19, the controller 200 increases the timers Tm1 and Tm3 by 1, respectively, and then judges whether or not the current turbine speed TREV is greater than the turbine speed TREVN for the post shift operation (step S22). If the current turbine speed TREV is greater than the turbine speed TREVN for the post shift operation, a target shift operation time period Tt is determined in light of a map 3 based on the initial turbine speed TREV0 and the speed ratio V1 (see FIG. 13) (step S23). On the other hand, if the current turbine speed TREV is not greater than the turbine speed TREVN for the post shift operation, the controller 200 returns to the step S21 and repeats the judgment.

Figure 14:
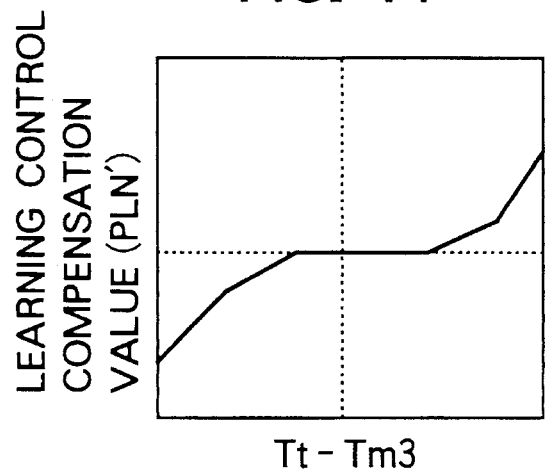
FIG. 14 is a tabular diagram showing a relationship between the compensation value and the shift operation time period; and, FIG. 15 is a graphical representation showing a performance of the torque converter.

After determining the target shift operation time period Tt, the controller 200 obtains a compensation value PLN' for the learning control value PN from table 1 (see FIG. 14) based on the target shift operation time period Tt and the actual shift operation time period Tm3 and renews the map 2 of the learning control value PLN based on the compensation value PLN' (step S25). In this case, as the value Tt−Tm3 is increased, the shift operation time period is reduced. Therefore, as the value Tt−Tm3 is increased, the compensation value PLN' is increased.

Then, the controller 200 sets a timer Tm2 for counting a time period within which the second element such as 2-4 brake 45 accomplishes a secure engagement in a shift operation (step S26), increases the timer Tm1 by 1 (step S27) and reduces the timer Tm2 by 1 (step S28). Then, the controller 200 calculates the duty ratio Da which provides the hydraulic pressure Pa of the 3-4 clutch ,(step S29), produces the duty ratio Da to the duty solenoid valve 90 (step S30), and judges whether or not the timer Tm2 is 0 (step S31). If the timer Tm2 is 0, the controller 200 produces signals for establishing the second solenoid pattern in which the first, second and third solenoid valves 66, 67 and 68 are ON, ON and ON respectively (step S32) and ends the shift control since it is considered that the second element (the 2-4 brake 45) is securely engaged. Conversely, if the timer Tm2 is not 0, the controller 200 returns to step S27.

Thus, the controller 200 releases the 3-4 clutch 43 as the first frictional element and engages the 2-4 brake 45 as the second frictional element. If the 3-2 shift operation is completed, the controller 200 produces a duty control signal which provides the duty control pressure for the first duty solenoid valve 90 greater than a predetermined value.

Meanwhile, the turbine torque TT can be obtained by the speed ratio V1 and the turbine speed TREV as follows:

---

Figure 15:
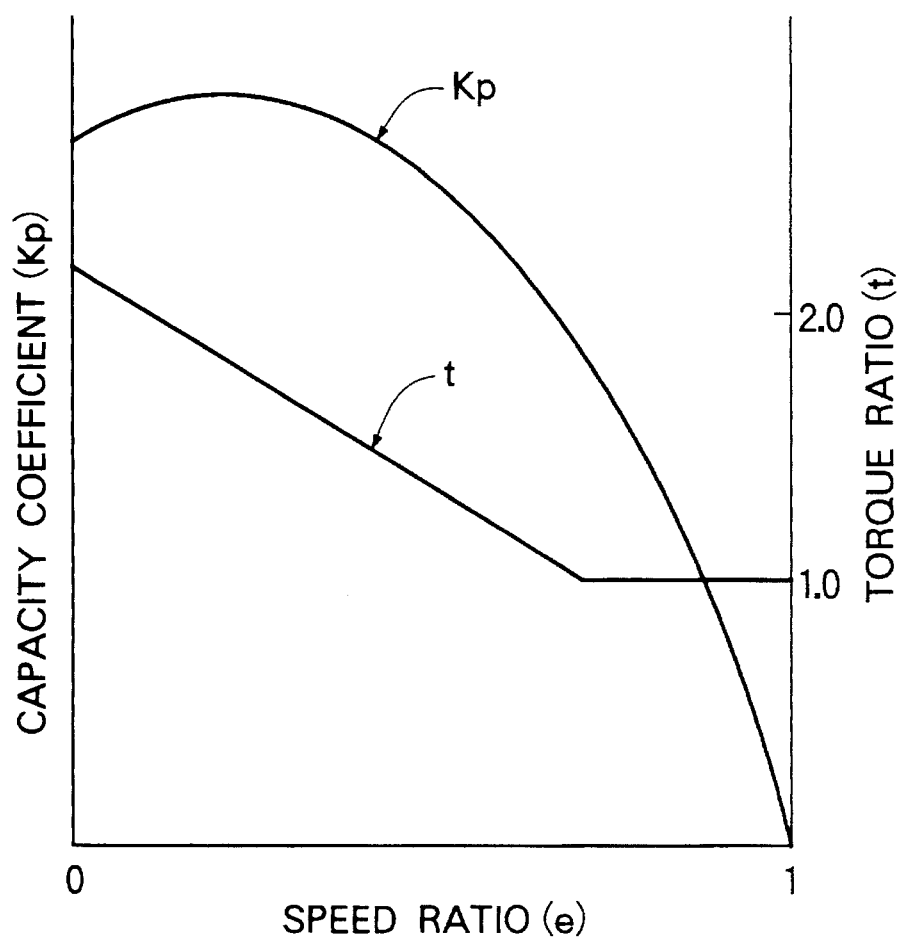

Assuming that the speed ratio V1 takes a value e,
the speed ratio e can be expressed by NT/NE (NT:turbine speed, NE:engine speed).
Thus, NE=NT/e --------- 1
The performance of the torque converter is known in advance as shown in FIG. 15.
Thus, TE=KP*(NE1000)$^2$ ----- 2
wherein KP is capacity coefficient.
TT=t*TE ------- 3
wherein t is torque ratio.
From the formulas from 1 through 3,
TT=t*KP*(NT/1000*e)$^2$.

---

Therefore, the turbine torque TT can be expressed by a function of the speed ratio e and the turbine speed NT as follows:

$$TT=f(e,NT).$$

Although the turbine torque can be obtained using the engine speed in place of the turbine speed, the turbine speed is advantageous in that the speed sensor therefor is more reliable than that for the engine speed.

Further, the engaging control section can be constituted by a timer wherein the second element such as the 2-4 brake 45 is engaged a predetermined time period after the shift command is produced.

Although the present invention has been explained with reference to a specific, preferred embodiment, one of ordinary skill in the art will recognize that modifications and improvements can be made while remaining within the scope and spirit of the present invention. The scope of the present invention is determined solely by the appended claims.

What is claimed is:

1. A shift control system of an automatic transmission comprising:

a first frictional element which is to be released in a shift operation, a second frictional element which is to be engaged in the shift operation, and a controller for (1) setting a target time period of the shift operation needed for releasing the first frictional element and engaging the second frictional element, (2) obtaining an actual time period of the shift operation needed for releasing the first frictional element and engaging the second frictional element, (3) determining a difference between the target time period and the actual time period, (4) controlling a releasing pressure of the first frictional element based on the difference between the target time period and the actual time period, and (5) controlling an engaging pressure of the second frictional element in the shift operation.

2. A shift control system as recited in claim 1 wherein the target time period for the shift operation is based on a turbine speed.

3. A shift control system as recited in claim 2 wherein a change in the releasing pressure is obtained through a map which provides a relationship between the turbine speed of the automatic transmission and a speed ratio of the turbine speed to an engine speed of a vehicle.

4. A shift control system as recited in claim 1 wherein the releasing pressure is determined based on a learning control value which is obtained based on a relationship between a turbine speed of the automatic transmission and a speed ratio of the turbine speed to an engine speed of a vehicle.

5. A shift control system as recited in claim 4 wherein the learning control value is determined based on a map which provides a relationship between the turbine speed and the speed ratio.

6. A shift control system as recited in claim 5 wherein the learning control value is renewed depending on the difference between the target time period and the actual time period.

7. A shift control system as recited in claim 6 wherein the learning control value is increased as the difference between the target time period and the actual time period is increased.

8. A shift control system as recited in claim 7 and further comprising a duty solenoid valve which is controlled by the controller based on the learning control value.

9. A shift control system as recited in claim 1 wherein said controller controls the engaging pressure by controlling a duty ratio of a duty solenoid valve.

10. A shift control system as recited in claim 1 wherein the engaging pressure of the second frictional element is based on a turbine speed of the automatic transmission.

11. A shift control system as recited in claim 1 wherein said controller further detects an abrupt acceleration condition and causes the shift operation to be made more quickly when the abrupt acceleration is detected than when the abrupt acceleration is not detected.

12. A shift control system as recited in claim 11 wherein, when the abrupt acceleration condition is detected, control of the releasing pressure is prohibited and a hydraulic supply for the first and second frictional elements is switched to quickly complete said shift operation.

13. A shift control system as recited in claim 12 and further comprising a shift valve which switches the hydraulic supply.

14. A shift control system as recited in claim 13 wherein the shift valve is switched corresponding to ON-OFF control of a solenoid valve.

* * * * *